June 14, 1949.  E. T. McBEE ET AL  2,473,162
LIQUID PHASE CHLORINATION
Filed Dec. 20, 1945
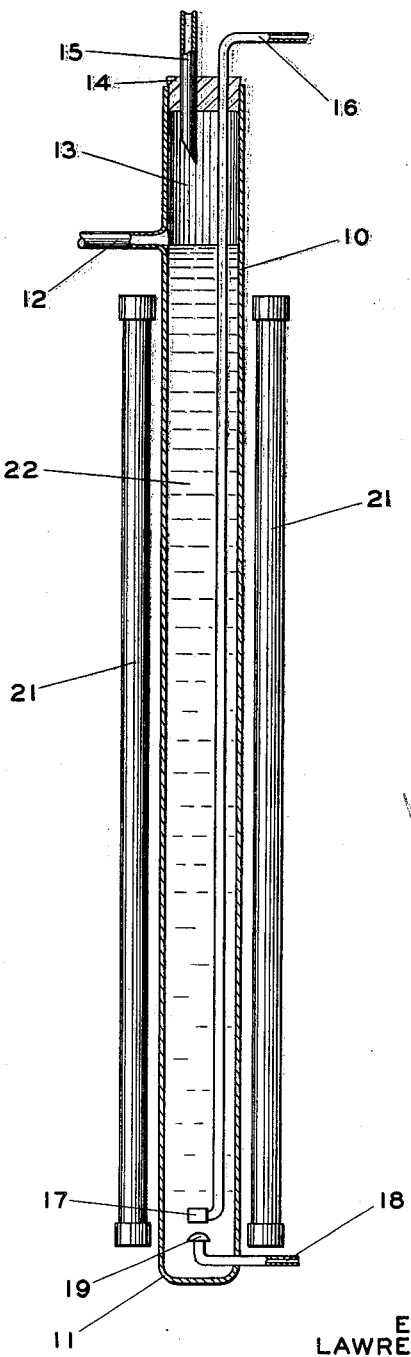
INVENTOR.
EARL T. MC BEE
LAWRENCE W. DEVANEY
BY
Dean Laurence
ATTORNEY Patented June 14, 1949

2,473,162

UNITED STATES PATENT OFFICE 2,473,162

LIQUID PHASE CHLORINATION

Earl T. McBee, West Lafayette, Ind., and Lawrence W. Devaney, Fishkill, N. Y., assignors to Purdue Research Foundation, West Lafayette, Ind., a corporation of Indiana Application December 20, 1945, Serial No. 636,267

13 Claims. (Cl. 204—163)

This invention relates to a continuous process for the chlorination of aliphatic and alicyclic hydrocarbons having in the molecule between three and eight carbon atoms, inclusive, and chlorinated derivatives thereof, and is particularly concerned with the production therefrom of highly chlorinated hydrocarbon mixtures.

The fact that most hydrocarbons and chlorine react in the presence of light with explosive violence over a wide range of proportions has presented a major difficulty in processes involving the direct chlorination thereof. The obvious method of carrying out the reaction for the preparation of highly chlorinated hydrocarbon mixtures is, of course, to mix the chlorine and hydrocarbon compound in proportions outside the explosive limits. This method is not commercially desirable, since it involves the repeated introduction of very small proportions of chlorine with sufficient time allowed between each successive introduction to permit reaction to occur. Even when this method is followed, burning often results due to high local concentrations of chlorine. Numerous other ways of carrying out the reaction have been suggested, such as causing the chlorine and hydrocarbon to react in extremely narrow reaction chambers in close contact with cooled surfaces to provide efficient cooling of the reacting mixture, diluting the reactants with an inert gas, while mixing in the dark and thereafter reacting the materials in inert media, and various other ways. Generally speaking, these processes have not proven satisfactory in commercial practice for the preparation of highly chlorinated hydrocarbon mixtures, using a hydrocarbon as the starting material, and the highly chlorinated hydrocarbons are prepared by chlorinating a lower chlorinated hydrocarbon obtained by methods other than direct chlorination of hydrocarbons, such as the addition of chlorine to unsaturated hydrocarbons.

In certain instances, such as in reactions involving the production of hexachloroethane, tetrachloroethylene, hexachlorobutadiene, carbon tetrachloride, and hexachlorocyclopentadiene, a highly chlorinated hydrocarbon is desired having a specific gravity greater than about 1.3, preferably greater than about 1.65, and substantially free of chlorinated hydrocarbons having a specific gravity less than about 1.3. Such polychlorohydrocarbon mixtures have heretofore best been prepared by the batch-wise chlorination of hydrocarbons or lower chlorinated hydrocarbons followed by distillation from the product of substances having an undesirably low proportion of chlorine. It is difficult in such batch-wise chlorination to continue the chlorination for a sufficiently long period to produce substantially only chlorohydrocarbons having a density above about 1.3 without producing undesired chlorinolysis and chlorinating excessively some of the substances present. Recycling of a considerable amount of distilled insufficiently chlorinated substances is also necessary and the partially chlorinated hydrocarbons used as starting material renders the process uneconomical. This is especially true in the preparation of polychlorohydrocarbon mixtures having a density from about 1.65 to about 1.75 which are particularly desirable for use in chlorinolysis reactions. Other disadvantages of such batch-wise chlorination are apparent. Insofar as we are aware, no satisfactory commercial process has been devised which can be operated in continuous manner for the preparation of polychlorohydrocarbon mixtures having a specific gravity greater than about 1.3 by the direct chlorination of hydrocarbons of the group herein concerned.

It is, therefore, an object of the present invention to provide a continuous process for the production of certain polychlorohydrocarbon mixtures having a desired specific gravity above about 1.3. An additional object is to provide a continuous process for the direct chlorination of certain hydrocarbons to produce a polychlorohydrocarbon mixture having a desired specific gravity above about 1.3. A further object is to provide a continuous process for the production of polychlorohydrocarbon mixtures by the chlorination of hydrocarbons without danger of burning or of the formation of colored reaction products. A particular object of this invention is to provide a process wherein a high economy of chlorine utilization is accomplished.

We have now found that the chlorination of hydrocarbons can be carried out rapidly and economically, and with the production of a mixture of highly chlorinated hydrocarbons having a specific gravity of the product desired, by introducing a hydrocarbon having in the molecule between three and eight carbon atoms, inclusive, and gaseous chlorine continuously and simultaneously, and at separate points substantially removed from one another, into a body of mixed polychlorohydrocarbons, maintained at a temperature not to exceed substantially above 150 degrees centigrade, preferably while causing liquid polychlorohydrocarbons from the region around the point of introduction of the hydrocarbon to flow or move away from such region into the region around the point of introduction of chlorine. In this way the hydrocarbon, which is first introduced into the moving body of polychlorohydrocarbons, becomes dispersed therein and the resulting mixture then moves into the region around the chlorine inlet where the hydrocarbon reacts rapidly and smoothly with chlorine. It is possible also to introduce the chlorine into a moving body of polychlorohydrocarbons to produce a dispersion thereof and then to bring this dispersion into contact with thte hydrocarbon dispersion by locating the chlorine inlet below the hydrocarbon inlet, and, while this is not our preferred mode of operation, it is intended to be included within the scope of our claims.

A polychlorohydrocarbon product having the desired specific gravity is withdrawn continuously from the body of liquid polychlorohydrocarbon mixture and in this way the volume of the mixture of polychlorohydrocarbons in the reaction vessel is kept substantially constant. Hydrogen chloride and, usually, a small proportion of unreacted hydrocarbon evolve from the liquid in gaseous form and may be conducted away and utilized or disposed of in any way desired.

The reaction is catalyzed by exposing the body of polychlorohydrocarbon to the action of light having a wave length from about 2000 to 5000 Å, and particularly between about 3000 to about 4000 Å. Catalysts other than light are not employed and are preferably excluded from the reaction zone since they tend to promote the formation of color within the body of the liquid and thus to decrease the catalytic effectiveness of the light. Under optimum conditions the reaction appears to be substantially complete within a very short time, the actual reaction time being thought to depend largely upon the length of time required for uniformly contacting the chlorine with the hydrocarbon in the region immediately around the point of chlorine introduction.

This method is particularly applicable to the production of polychlorohydrocarbons of a specific gravity up to about 1.78. This is important inasmuch as the product produced by our method may undergo chlorinolysis in the vapor phase at elevated temperatures.

The polychlorohydrocarbon product obtained is water-white in color, has a substantially constant density, and contains only small proportions of dissolved hydrocarbon and hydrogen chloride. The product is suitable without further treatment for use directly in applications where small proportions of these substances are not disadvantageous, such as in reactions to produce hexachloroethane, tetrachloroethylene, hexachlorobutadiene, carbon tetrachloride, and hexachlorocyclopentadiene, depending upon the particular product being treated and the type of treatment used. If desired, the product may be washed with water to remove hydrogen chloride and then heated to remove traces of unreacted hydrocarbon compound and other low boiling substances which may be present.

Although it might be expected that the process described would be applicable under ordinary conditions to the production of polychlorohydrocarbon mixtures having a density less than 1.3, this is not the case. The density of the product up to 1.3 is substantially independent of the ratio of the amount of chlorine to hydrocarbon introduced. This ratio is not especially critical. It is unexpected that the density of the product produced by our process does not correspond to the density of the product which would be obtained by reacting all of the hydrocarbon with all of the chlorine introduced. Even though, at the beginning of the process, the reaction vessel be loaded with a polychlorohydrocarbon mixture having a density lower than that of the product desired and chlorination started, it is found that the density of the liquid in the vessel, and consequently of the product withdrawn, changes as chlorination proceeds and eventually assumes a value always above about 1.3.

From about two to about eighteen moles of chlorine is preferably used in the process for each mole of hydrocarbon. When less than about two moles of chlorine is used for each mole of hydrocarbon, the loss of the hydrocarbon in the form of unreacted material becomes excessive and the reaction does not proceed as smoothly as is desired.

When the reaction is carried out with the use of hydrocarbon starting material having less than six carbon atoms in the molecule and it is desired to produce a polychlorohydrocarbon mixture having a specific gravity above about 1.80, the use of pressure is advantageous.

The temperature of the body of polychlorohydrocarbon compounds wherein the reaction is carried out is maintained not to exceed substantially above 150 degrees centigrade, inasmuch as undesired chlorinolysis of certain of the polychlorohydrocarbon compounds may be initiated, and it is preferably maintained between about 50 degrees centigrade and about 125 degrees centigrade. We have found a temperature of about 100 degrees centigrade to be particularly desirable. The temperature of the body of polychlorobutanes wherein the reaction is carried out is maintained not to exceed substantially above 90 degrees centigrade, and it is preferably maintained in the range between about 70 degrees centigrade and about 90 degrees centigrade, and we have found a temperature of about 80 degrees centigrade to be particularly desirable. We have found that a marked decrease in temperature results in a leveling off of the density of the product at about 1.30 when the process is carried out at a temperature of minus 40 degrees centigrade in the case of polychloropropanes. There is a leveling off of the density of the product at 1.52 in the case of butane and butene when the process is carried out at zero degrees centigrade. This result is obtained independently of a constant rate of flow of chlorine and hydrocarbon in fixed proportions which would, at temperatures more elevated, produce a material of higher gravity.

Movement of liquid within the reaction zone portion of the body of polychlorohydrocarbon compounds from the region around the hydrocarbon inlet to the region around the chlorine inlet may be accomplished in any convenient manner, such as by agitation designed to cause a flow of liquid from the one region to the other without at the same time causing excessive agitation of the whole body of liquid. If desired, the hydrocarbon and chlorine inlets may be situated in a conduit immersed in the body of liquid and a current of liquid caused to flow through the conduit, first past the hydrocarbon inlet and then past the chlorine inlet. Preferably, however, the hydrocarbon inlet is situated within the body of liquid directly below and substantially removed from the chlorine inlet. Thus, when the hydrocarbon is introduced into the liquid, the density of the mixture in the region around the hydrocarbon inlet is lowered and the liquid therein rises and moves into the region around the chlorine inlet where the major part of the reaction occurs.

Hydrocarbon and chlorine are preferably delivered into the body of the liquid in finely divided form, e. g., through a sintered glass plate or tube, to promote dispersion thereof. Any convenient source of light of the desired wave length may be used, such as conventional tubular mercury lamps.

Reference is made to the accompanying drawing which shows a centrally cross-sectioned view of a particular apparatus which may be employed in practicing the process of the present invention. An apparatus, substantially as shown herein, was successfully used in carrying out the examples herein.

The apparatus is comprised of an elongated glass chlorinator tube 10 which is closed at its lower end 11. The glass tube 10 is provided with an overflow pipe 12 which communicates between the chamber 13 and a collector not shown.

A stopper 14 is inserted into the open upper end of the chlorinator tube 10. A gas exhaust pipe 15, which extends into the tube chamber 13 through an appropriate opening in the stopper 14, is connected to a scrubber or other suitable recovery means, not shown. The lower end of the gas exhaust pipe 15 is positioned above the point where the overflow pipe 12 engages the tube 10.

A chlorine supply pipe 16, which is connected to a source of chlorine, not shown, passes through another appropriate opening in the stopper 14 and extends down within the chamber 13 to a point near the tube bottom 11. A fritted glass plate 17 is secured in conventional manner to the lower end of the chlorine supply pipe 16.

A hydrocarbon supply pipe 18, which is connected to a source of hydrocarbon, not shown, is received through a suitable opening in the chlorinator tube 10 near the bottom 11 thereof. The end of said hydrocarbon supply pipe 18 within the tube chamber 13 preferably carries an alundum thimble 19 secured thereto in any convenient manner.

The overflow pipe, the gas exhaust pipe, the hydrocarbon supply pipe, and the chlorine supply pipe may be glass tubes.

A bank of tungsten filament lamps 21, which extend substantially the entire length of the chlorinator tube 10, is positioned around and adjacent to said tube.

The chlorinator tube 10 is filled to the overflow pipe 12 with a liquid polychlorohydrocarbon 22 having a specific gravity of substantially that which is desired in the chlorinated product to be produced within the above-described apparatus. Chlorine and hydrocarbon are introduced simultaneously and continuously into the chlorinator tube 10 through the supply pipes 16 and 18, respectively. The chlorine and hydrocarbon are diffused as they pass through the fritted glass plate 17 and the alundum thimble 19, respectively, into the liquid body of polychlorohydrocarbon 22.

The hydrocarbon becomes dispersed in the polychlorohydrocarbon as it moves away from the region around the alundum thimble 19, and moves into the region around the fritted glass plate 17 for reaction with chlorine. The radiation from the tungsten lamps 21 catalyzes the reaction between the hydrocarbon and the chlorine.

The polychlorohydrocarbon mixture, resulting from the reaction and having the desired specific gravity, is withdrawn from the tube chamber 13 through the overflow tube 12, while vapors evolved during the process are conducted away from the tube chamber 13 through the exhaust pipe 15.

Certain advantages of the invention are apparent from the following examples, which are given by way of illustration only and are not to be construed as limiting:

EXAMPLE 1.—PROPANE

In order to provide a starting body of reaction medium of the desired specific gravity, a quantity of 1,2-dichloropropane having a specific gravity of 1.15 was placed in a vertical Pyrex glass column one and one-quarter inches in diameter, closed at its lower end, and having an over-flow tube located about 30 inches from the closed end. About 690 grams of 1,2-dichloropropane was required to fill the reactor tube up to the over-flow. Means was provided to collect liquid from the overflow tube and to conduct evolved vapors away from the top of the tube. Propane was introduced into the body of liquid through an alundum thimble located near the bottom of the column and chlorine was introduced through a fritted glass plate located about one inch directly above the propane inlet. The rates of flow of chlorine and propane vapors were first regulated so that two volumes of chlorine were introduced into the reactor for each volume of propane. Four 200-watt clear glass tungsten filament lamps were placed around the lower portion of the reactor column to catalyze the reaction. The product overflowing from the column was collected in separate successive portions, the specific gravity of each portion determined, and the process continued until the specific gravity of successive portions was substantially constant.

In the following Table 1 there are given the specific gravities of the portions collected, the time at which each was collected, and the amount of product in each portion. Volumes of chlorine and propane were measured at room temperature.

Table 1

Vol. Chlorine-2
Vol. Propane-1

| Time, hrs. | Portion No. | Sp. Gr. | Weight of Portion, gms. |
|---|---|---|---|
| 0 | 1 | (1.15) | -------- |
| 2 | 2 | 1.219 | 212 |
| 10 | 3 | 1.34 | 327 |
| 15 | 4 | 1.470 | 282 |
| 20 | 5 | 1.507 | 279 |
| 25 | 6 | 1.516 | 274 |
| 30 | 7 | 1.521 | 302 |

The procedure just described was repeated several times using, respectively, 3, 4, 5, and 6 volumes of chlorine for each volume of propane. The data obtained are given in the following respective Tables 2, 3, 4, and 5.

Table 2

Vol. Chlorine-3
Vol. Propane-1

| Time, hrs. | Portion No. | Sp. Gr. |
|---|---|---|
| 0 | 1 | (1.15) |
| 5 | 2 | 1.370 |
| 8 | 3 | 1.435 |
| 15 | 4 | 1.513 |
| 19 | 5 | 1.545 |
| 25 | 6 | 1.566 |
| 33 | 7 | 1.586 |
| 42 | 8 | 1.590 |
| 46 | 9 | 1.597 |
| 47.5 | 10 | 1.598 |
| 60 | 11 | 1.598 |

Table 3

Vol. Chlorine-4
Vol. Propane-1

| Time, hrs. | Portion No. | Sp. Gr. | Weight of Portion, gms. |
|---|---|---|---|
| 0 | 1 | (1.15) | ------ |
| 2 | 2 | 1.247 | 111 |
| 10 | 3 | 1.469 | 262 |
| 15 | 4 | 1.534 | 248 |
| 20 | 5 | 1.571 | 280 |
| 25 | 6 | 1.588 | 296 |
| 30 | 7 | 1.601 | 296 |

Table 4

Vol. Chlorine-5
Vol. Propane-1

| Time, hrs. | Portion No. | Sp. Gr. | Weight of Portion, gms. |
|---|---|---|---|
| 0 | -- | (1.15) | --- |
| 6 | 1 | 1.365 | 79 |
| 18 | 2 | 1.577 | 238 |
| 24 | 3 | 1.613 | 253 |
| 36 | 4 | 1.646 | 274 |
| 42 | 5 | 1.652 | 314 |
| 54 | 6 | 1.665 | 296 |
| 57.5 | 7 | 1.672 | 167 |
| 66 | 8 | 1.687 | 385 |
| 76 | 9 | 1.691 | 425 |
| 86 | 10 | 1.692 | 460 |

Table 5

Vol. Chlorine-6
Vol. Propane-1

| Time, hrs. | Portion No. | Sp. Gr. | Weight of Portion, gms. |
|---|---|---|---|
| 0 | -- | (1.15) | --- |
| 5 | 1 | 1.359 | 60 |
| 14 | 2 | 1.581 | 347 |
| 23 | 3 | 1.639 | 399 |
| 35 | 4 | 1.701 | 587 |
| 45 | 5 | 1.716 | 479 |
| 56 | 6 | 1.727 | 603 |
| 67 | 7 | 1.733 | 594 |
| 81 | 8 | 1.738 | 710 |
| 93 | 9 | 1.739 | 640 |
| 106 | 10 | 1.737 | 660 |

EXAMPLE 2.—PROPANE

The reactor described in Example 1 was filled to the overflow tube with a polychloropropane mixture having a specific gravity of 1.521. Propane and chlorine were introduced into the reactor at the respective rates of 20 liters and 40 liters per hour. The product which was collected from the overflow initially had a specific gravity of 1.521 and this remained substantially unchanged over a period of more than 30 hours. The product was water-white and entirely liquid at room temperature.

EXAMPLE 3.—BUTENE

The reactor described in Example 1 was filled to the overflow with a polychlorobutane mixture having a specific gravity of 1.628. Butene and chlorine were introduced into the reactor at the respective rates of three liters and fifteen liters per hour for more than forty hours. The product which was collected from the overflow had a substantially uniform specific gravity of 1.625.

EXAMPLE 4.—BUTANE

The reactor described above was filled to the overflow with a polychlorobutane mixture having a specific gravity of 1.68. Chlorine and butane were introduced into the reactor in the ratio of seven moles of chlorine per mole of butane. The temperature of the reactor was maintained at zero degrees centigrade. The density of the product after forty-five hours of operation leveled off at 1.52 and remained substantially constant thereafter.

Mixtures of butane and butene may be used in making polychlorobutanes in substantially the same manner as shown in the examples above-described.

EXAMPLE 5.—N-PENTANE

A quantity of polychloro compounds of n-pentane having a specific gravity of 1.57 was placed into the reactor described in Example 1. Normal-pentane and chlorine were introduced into the reactor at a ratio of 8.9 moles of chlorine to one mole of n-pentane. The n-pentane was first preheated by placing a cylindrical bomb containing the n-pentane in a water bath maintained at a temperature of 70 to 75 degrees centigrade. The cooling on expansion of the n-pentane as it passed through a needle valve necessitated application of external heat in the form of a 100 watt light bulb to prevent condensation of n-pentane. The product which was collected from the overflow had a substantially uniform specific gravity of 1.61.

EXAMPLE 6.—NEOHEXANE

A quantity of polychloro compounds of 2,2-dimethylbutane having a specific gravity of about 1.6 was placed into the reactor described in Example 1. 2,2-dimethylbutane and chlorine were introduced into the reactor at a ratio of nine moles of chlorine to one mole of the 2,2-dimethylbutane. The product which was collected from the overflow had a substantially uniform specific gravity of 1.73.

EXAMPLE 7.—N-HEPTANE

The reactor described in Example 1 was filled to the overflow with polychloro compounds of n-heptane having a specific gravity of 1.5. Normal-heptane and chlorine were introduced into the reactor at a ratio of ten moles of chlorine to one mole of n-heptane. The product which was collected from the overflow had a substantially uniform specific gravity of 1.7789.

EXAMPLE 8.—2,2,3-TRIMETHYLBUTANE

The reactor described in Example 1 was filled to the overflow with polychloro compounds of 2,2,3-trimethylbutane having a specific gravity of 1.3. 2,2,3-trimethylbutane and chlorine were introduced into the reactor at a ratio of eight moles of chlorine to one mole of 2,2,3-trimethylbutane. The product collected from the overflow had a substantially uniform specific gravity of 1.652.

EXAMPLE 9.—2,2,4-TRIMETHYLPENTANE

The reactor described in Example 1 was filled to the overflow with polychloro compounds of 2,2,4-trimethylpentane having a specific gravity of 1.54. Chlorine and 2,2,4-trimethylpentane were introduced into the reactor at a ratio of eight moles of chlorine to one mole of 2,2,4-trimethylpentane. The product collected from the overflow had a substantially uniform specific gravity of 1.602.

EXAMPLE 10.—CYCLOPENTANE

The reactor described in Example 1 was filled to the overflow with polychloro compounds of cyclopentane having a specific gravity of 1.634. Cyclopentane and chlorine were introduced into the reactor at a ratio of nine moles of chlorine to one mole of cyclopentane. The product which was collected from the overflow had a substantially uniform specific gravity of 1.668.

EXAMPLE 11.—METHYLCYCLOPENTANE

The reactor described in Example 1 was filled to the overflow with polychloro compounds of methylcyclopentane having a specific gravity of 1.574. Methylcyclopentane and chlorine were introduced into the reactor at a ratio of 9.5 moles of chlorine to one mole of methylcyclopentane. The product which was collected from the overflow had a substantially uniform specific gravity of 1.7151.

Our process is applicable to chlorination of the lower partially chlorinated derivatives of the aliphatic and alicyclic hydrocarbons, and can be used in the event these are available at advantageous prices. Our improved procedure provides a simple, convenient manner of preparing the highly chlorinated derivatives of the aliphatic and alicyclic hydrocarbons having in the molecule between three and eight carbon atoms and containing insufficient chlorine to cause the production of material amounts of solid derivatives. A particular advantage of our process resides in the fact that mixtures of substantially uniformly highly chlorinated products are obtained substantially free from lower chlorinated derivatives.

Reference is made to our copending applications Serial 618,788 and 618,789, both filed September 26, 1945, the former now abandoned, in which are described a continuous process for the chlorination of butane to produce a highly chlorinated polychlorobutane mixture and a continuous process for the chlorination of propane to produce a highly chlorinated polychloropropane mixture, respectively. In the said applications the stated subject matter is more particularly described and specifically claimed.

We claim:

1. The method which includes: (1) maintaining a body of liquid polychlorohydrocarbons (A) having the same number of carbon atoms in the molecule as the starting material (B) and a specific gravity greater than the starting material (B), said specific gravity of (A) being greater than about 1.3; (2) continuously introducing, through diffusion means into said liquid body (A) at a point in a first region thereof, a starting material (B) selected from the group consisting of aliphatic and alicyclic hydrocarbons and partially chlorinated aliphatic and alicyclic hydrocarbons, having in the molecule between three and eight carbon atoms, inclusive, said starting material (B) having a specific gravity less than that of the body of liquid polychlorohydrocarbons (A) into which said starting material (B) is introduced; (3) introducing chlorine into a second region of said liquid body (A); (4) causing liquid polychlorohydrocarbon (A) containing dispersed starting material (B) to move continuously from the one region into the other region in the liquid body (A); (5) catalyzing the chlorination reaction with actinic light; (6) maintaining a temperature between about zero degrees and about 150 degrees centigrade in the reaction zone; (7) maintaining a chlorine to starting material (B) mole ratio between about 2 to 1 and 18 to 1; and, (8) continuously withdrawing a liquid polychlorohydrocarbon product (C) having a substantially constant specific gravity greater than about 1.3 and greater than that of said starting material (B) from an upper portion of the said body of liquid (A) at a point removed from said first and second regions.

2. The process as claimed in claim 1, wherein the amount of chlorine introduced is between about 2 and about 10 moles for each mole of starting material (B) introduced.

3. The process as claimed in claim 1, wherein the temperature of the reaction zone is maintained between about 50 degrees and about 125 degrees centigrade.

4. The process as claimed in claim 1, wherein the starting material (B) contains at least four carbon atoms in the molecule, and wherein the specific gravity of the polychlorohydrocarbon product (C) is greater than about 1.5.

5. The method which includes: (1) maintaining a body of liquid polychlorobutanes (A) having a specific gravity greater than the starting material (B), said specific gravity of (A) being greater than about 1.52; (2) continuously introducing through diffusion means into said liquid body (A) at a point in a first region thereof, a starting material (B) consisting of butanes, said starting material (B) having a specific gravity less than about 1.52 and less than that of the body of liquid polychlorobutanes (A) into which said starting material (B) is introduced; (3) introducing chlorine into a second region of said liquid body (A); (4) causing liquid polychlorobutanes (A) containing dispersed starting material from the one region to move continuously into the other region in the liquid body (A); (5) catalyzing the chlorination reaction with actinic light; (6) maintaining a temperature between about zero degrees and about 90 degrees centigrade in the reaction zone; (7) maintaining a chlorine to starting material (B) molar ratio of about 7 to 1 and sufficient to convert the (B) introduced to a product (C) of the desired specific gravity; and (8) continuously withdrawing a liquid polychlorobutane product (C) having a substantially constant specific gravity greater than about 1.52 and greater than that of the said starting material (B) from an upper portion of the said body of liquid (A) at a point removed from the said first and second regions.

6. The process as claimed in claim 5, wherein the body of liquid polychlorobutanes (A) has a specific gravity greater than about 1.6; and wherein the liquid polychlorobutane product (C) has a substantially constant specific gravity greater than about 1.6.

7. The process as claimed in claim 5, wherein the body of liquid polychlorobutanes (A) has a specific gravity greater than about 1.6; wherein the liquid polychlorobutane product (C) has a substantially constant specific gravity greater than about 1.6; and wherein the reaction mixture is maintained at a pressure greater than atmospheric.

8. The process as claimed in claim 5, wherein the temperature of the reaction zone is maintained between about 70 and about 90 degrees centigrade.

9. The method which includes: (1) maintaining a body of liquid polychlorobutanes (A) having a specific gravity greater than the starting material (B), said specific gravity of (A) being greater than about 1.52; (2) continuously introducing through diffusion means into said liquid body (A) at a point in a first region thereof, a starting material (B) consisting of butanes, said starting material (B) having a specific gravity less than about 1.52 and less than that of the body of liquid polychlorobutanes (A) into which said starting material (B) is introduced; (3) introducing chlorine into a second region of said liquid (A); (4) causing liquid polychlorobutanes (A) containing dispersed starting material from the one region to move continuously into the other region in the liquid body (A); (5) catalyzing the chlorination reaction with actinic light; (6) maintaining a temperature between about zero degrees and about 90 degrees centigrade in the reaction zone; (7) maintaining a chlorine to starting material (B) molar ratio of about 5 to 1 and sufficient to convert the (B) introduced to a product (C) of the desired specific gravity; and (8) continuously withdrawing a liquid polychlorobutane product (C) having a substantially constant specific gravity greater than about 1.52 and greater than that of the said starting material (B) from an upper portion of the said body of liquid (A) at a point removed from the said first and second regions.

10. The process as claimed in claim 9, wherein the body of liquid polychlorobutanes (A) has a specific gravity greater than about 1.6; and wherein the liquid polychlorobutane product (C) has a substantially constant specific gravity greater than about 1.6.

11. The process as claimed in claim 9, wherein the body of liquid polychlorobutanes (A) has a specific gravity greater than about 1.6; wherein the liquid polychlorobutane product (C) has a substantially constant specific gravity greater than about 1.6; and wherein the reaction mixture is maintained at a pressure greater than atmospheric.

12. The process as claimed in claim 9, wherein the temperature of the reaction zone is maintained between about 70 and about 90 degrees centigrade.

13. The method which includes: (1) maintaining a body of liquid polychloroneohexanes (A) having a specific gravity greater than the starting material (B), said specific gravity of (A) being greater than about 1.6; (2) continuously introducing through diffusion means into said liquid body (A) at a point in a first region thereof, a starting material (B) consisting of neohexane, said starting material (B) having a specific gravity less than about 1.6 and less than that of the body of liquid polychloroneohexanes (A) into which said starting material (B) is introduced; (3) introducing chlorine into a second region of said liquid body (A); (4) causing liquid polychloroneohexanes (A) containing dispersed starting material from the one region to move continuously into the other region in the liquid body (A); (5) catalyzing the chlorination reaction with actinic light; (6) maintaining a temperature between about 50 degrees centigrade and about 125 degrees centigrade in the reaction zone; (7) maintaining a chlorine to starting material (B) molar ratio of about 9 to 1; and (8) continuously withdrawing a liquid polychloroneohexane product (C) having a substantially constant specific gravity greater than about 1.6 and greater than that of the said starting material (B) from an upper portion of the said body of liquid (A) at a point removed from the said first and second regions.

EARL T. McBEE.
LAWRENCE W. DEVANEY.

REFERENCES CITED

The following references are of record in the file of this patent:

UNITED STATES PATENTS

| Number | Name | Date |
|---|---|---|
| 1,191,916 | Brooks et al. | July 18, 1916 |
| 1,248,065 | Blanc | Nov. 27, 1917 |
| 1,523,563 | Snelling | Jan. 20, 1925 |
| 2,015,044 | Teichman et al. | Sept. 17, 1935 |
| 2,147,577 | Hass et al. | Feb. 14, 1939 |
| 2,193,824 | Lockwood et al. | Mar. 19, 1940 |
| 2,200,255 | Bender | May 14, 1940 |
| 2,368,495 | Schiller | Jan. 30, 1945 |
| 2,377,669 | Brown et al. | June 5, 1945 |